I. LEHMAN.
SHAFT COUPLING.
APPLICATION FILED SEPT. 2, 1909.
980,296.
Patented Jan. 3, 1911.
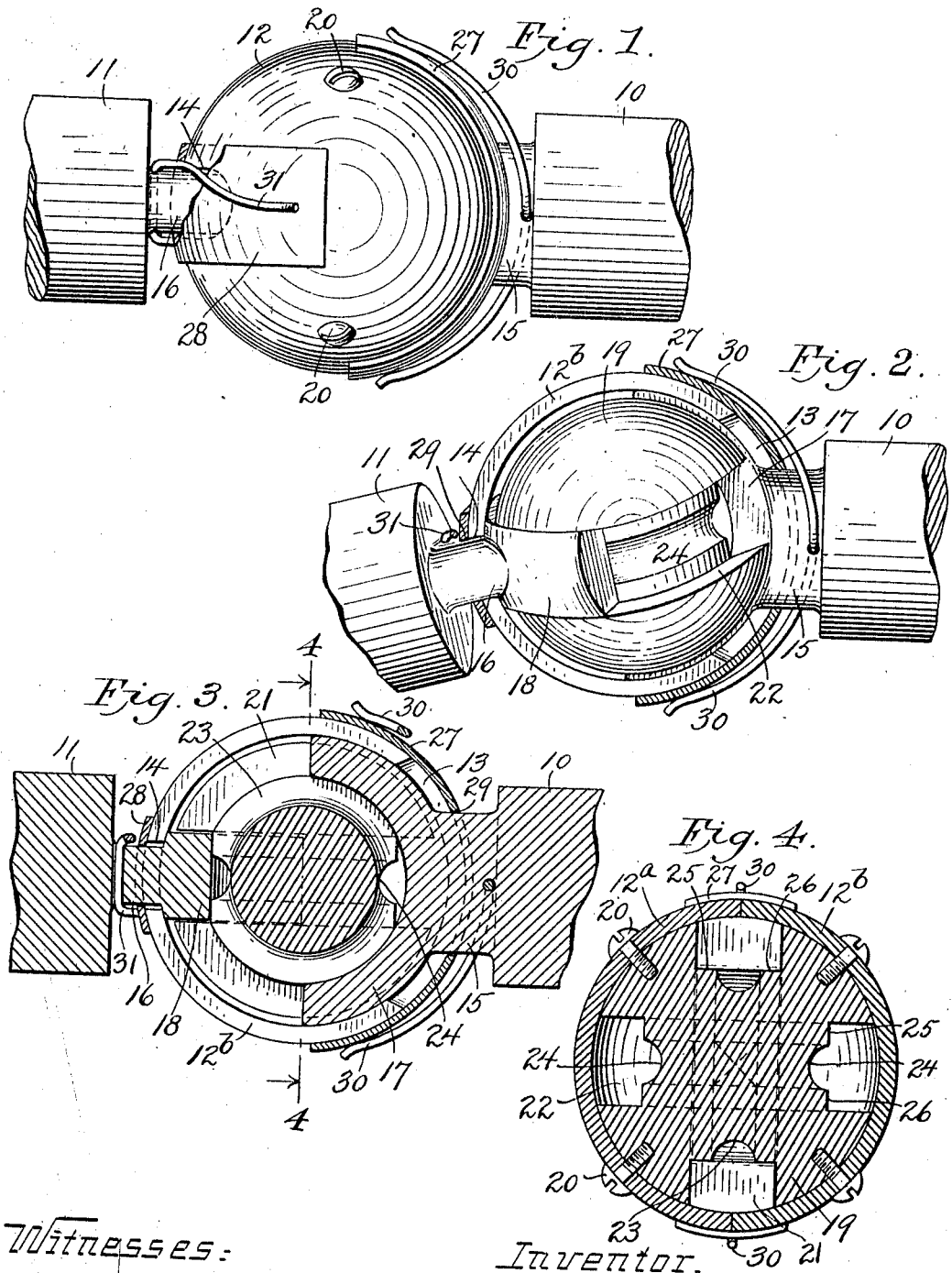

UNITED STATES PATENT OFFICE.

ISADOR LEHMAN, OF CLEVELAND, OHIO.

SHAFT-COUPLING.

980,296.

Specification of Letters Patent. Patented Jan. 3, 1911.

Application filed September 2, 1909. Serial No. 515,764.

*To all whom it may concern:*

Be it known that I, ISADOR LEHMAN, a citizen of the United States, residing at Cleveland, in the county of Cuyahoga and State of Ohio, have invented certain new and useful Improvements in Shaft-Couplings, of which the following is a specification.

This invention relates to improvements in shaft couplings or universal joints which are employed for connecting together two shafts or other rotatable power transmitting members arranged either in alinement or at an angle to each other, and is designed as an improvement over the coupling disclosed in my prior Patent No. 765,897, granted July 26, 1904.

One of the main objects of my present invention is to simplify the construction of shaft couplings of the character indicated and to provide a coupling wherein there is rendered a continuous central working of the operating parts and wherein the connecting parts are at all times held in alinement or in their proper positions.

A further object is to prolong the life of shaft couplings, to provide a greater space for lubricant, and to reduce the friction of the working parts to a minimum by evolving a housing for lubricating the parts and by providing a joint which is absolutely dust-proof.

A further object is to provide a coupling having greater wearing surfaces and greater leverage between the working parts than is provided in a coupling of the same size or external diameter, and constructed in accordance with the disclosures of my prior patent.

A further object is the provision of a coupling which is superior in strength to other couplings of corresponding size.

A still further object is to provide a joint having a construction such that projecting parts are eliminated, thus obviating any danger of articles such as clothing being caught on the coupling if brought in contact with the latter when in motion.

With these objects in view my invention may be briefly stated as consisting in certain novel features of construction and combinations and arrangements of parts which will be described in the specification and pointed out in the appended claims.

For an understanding of my invention reference is had to the accompanying sheet of drawings wherein—

Figure 1 is a side elevation of a shaft coupling or joint constructed in accordance with my invention. Fig. 2 is a perspective view of the same with half of the casing removed and other parts in section. Fig. 3 is a longitudinal sectional view of the same. Fig. 4 is a transverse sectional view of the same substantially along the line 4—4 of Fig. 3 looking in the direction indicated by the arrows.

Referring now to the figures of the drawing, wherein I have shown the preferred embodiment of my invention, 10 and 11 represent respectively the adjacent ends of two shafts or power transmitting members which are designed to be coupled together by my improved coupling which includes a casing 12 preferably in the form of a spherical shell having inner and outer spherical surfaces which are concentric with respect to each other. This shell is divided into halves 12ª and 12ᵇ and is provided with two elongated arc-shaped slots 13 and 14 which are diametrically opposite and are arranged at right-angles to each other, the line of division between the halves of the shell dividing the slot 13 centrally and longitudinally and the slot 14 centrally but transversely, so that the parts of the coupling may be readily assembled or taken apart as will appear presently. The shaft sections 10 and 11 are provided with rectangular-shaped shanks 15 and 16 which extend through the slots 13 and 14 respectively of the casing and at their inner ends are provided with half-circular forks or jaws 17 and 18 which, as will be explained presently, form part of the coupling.

On the interior of the casing is a spherical bearing member 19 of a size such that it fits closely within the casing and engages the inner spherical surface of the latter. The spherical bearing member 19 is preferably held from movement within the casing by means of screws 20 which pass through each half of the casing into the member 19, the screws being 90° apart and entering the member 19 midway between annular working grooves therein as shown clearly in Fig. 4. The sphere or spherical member 19 is provided with two peripheral annular bearing or working grooves 21 and 22 which extend completely around the sphere centrally thereof and are arranged so that they intersect each other at right-angles these grooves, as will be apparent from the drawing, receiving and guiding the forks or jaws 17 and 18 at the ends of the shaft sections. Each of the grooves has parallel side walls and a bottom wall which is annular and preferably cylindrical, the cylindrical surfaces having their axes passing through the center of the sphere. Each of the forks or jaws 17 and 18 is of a size and shape such that it fits snugly but with good working fit into the corresponding annular grooves 21 or 22, each of these forks having an inner cylindrical surface adapted to engage the cylindrical inner or bottom of the corresponding groove, and having parallel sides which are adapted to engage the parallel side walls of the groove, and having also an outer surface spherical in contour and adapted to bear against the overlying portion of the inner spherical surface of the shell or casing 12.

As before stated, each of the forks or jaws is half circular or extends half way about the corresponding annular groove in the sphere. This construction leaves ample space for the jaws to work freely relative to one another as will be apparent from the inspection of Figs. 2 and 3, the remaining space of each bearing groove in the sphere not occupied by the half circular fork or jaw being designed to be filled with a lubricant, which will be forced back and forth in the grooves and between the bearing and working surfaces of the forks, sphere 19, and shell 12 against which the forks bear.

To enhance the lubrication of the working parts and to increase the space for the lubricant the inner or lower portions of the two working grooves 21 and 22 are provided with centrally disposed annular grooves 23 and 24, each being preferably substantially half round in cross section and being located midway between the parallel side walls of the groove so as to leave annular cylindrical shoulders or bearing surfaces 25 and 26 for the inner surfaces of the corresponding fork or jaw. These grooves 23 and 24 as well as the unoccupied spaces in the bearing grooves 21 and 22 will be preferably filled with a good lubricant preferably in the form of a semiliquid mass. Thus it will be seen that with this construction the back or outward thrust of the shafts will be taken or resisted by the inner spherical surface of the casing and the inner thrust will be taken by the cylindrical bottom surfaces of the bearing grooves 21 and 22 while the parallel sides of the grooves and the parallel sides of the forks or jaws form bearing or working surfaces in the transmission of power between the shaft sections. It may be noted also at this point that the construction of the coupling is extremely simple and the coupling is inexpensive to manufacture, although very efficient, it will have long life, ample bearing surfaces are provided, and all parts will be thoroughly lubricated with the result that friction is minimized. The coupling above described is an improvement over my prior construction in a further respect, for the reason that with the present construction a larger working surface and leverage and greater strength is obtainable in a coupling of given size or external diameter than is obtainable in a coupling of like size and having a construction such as disclosed in my prior patent.

To exclude dust from the interior of the casing and between the working parts, I provide closures 27 and 28 for the elongated slots 13 and 14 of the casing through which the shaft sections extend, and these closures are each in the form of elongated caps or plates which are curved or rounded so as to correspond to the spherical shape of the casing and lie closely thereon, each plate having an opening 29 through which the elongated rectangular portion of the corresponding shaft section extends, the opening being of a shape such that it will receive the shaft section with a close fit. The closing plates 27 and 28 extend a sufficient distance around the spherical casing 12 that the slots 13 and 14 in the shell will at all times be closed regardless of the relative movements of the shaft sections in the slots. The plates are held yieldingly down upon the shell or casing 12 so as to effectively exclude dust and so they can be lifted away from the casing in case it is desired to remove or place in position one or both halves of the casing and I prefer to employ for this purpose springs 30 and 31 each of which extends through a transverse opening in the center of the rectangular portion of the corresponding shaft section and is bent along the sides of the latter and extends in opposite directions over and along the corresponding closing or cover plate, and has its end portions bearing on the latter near the ends thereof. Thus as the shaft sections are shifted in the slots 13 and 14 these plates follow the same, so to speak, and at all times cover the slots and prevent the entrance of dust therein.

If desired the shell or casing may be provided with openings for the admission of a lubricant, and these openings may be normally closed in any suitable manner.

Although I have shown the preferred embodiment only of my invention, considerable variations may be made in the details without departing from the spirit and scope of my invention, and I aim in my claims to cover all such modifications.

What I claim as new and desire to secure by Letters Patent is:—

1. In a universal joint, a pair of shaft sections each having a neck with flat sides, a fork for each shaft section at the end of its neck portion, an internal coupling member having grooves cutting each other at right-angles and receiving the forks of the shaft section, an independent spherical casing rigidly secured to the coupling member and provided with slots arranged substantially at right-angles to each other and adapted to receive the necks of the shaft sections, a cover plate for each of said slots and conforming to the exterior of the spherical casing and provided with an opening having straight edges for engagement with the flat sides of the neck of the corresponding shaft section whereby rotation of the plate with respect to the corresponding shaft section is prevented, and means for forcing each of said plates yieldingly against the spherical casing.

2. In a universal joint, a pair of shaft sections each having a neck with flat sides, a fork for each shaft section at the end of its neck portion, an internal coupling member having grooves cutting each other at right-angles and receiving the forks of the shaft sections, an independent spherical casing rigidly secured to the coupling member and provided with slots arranged substantially at right-angles to each other and each adapted to receive the neck of one of the shaft sections, a cover plate for each of said slots and conforming to the exterior of the spherical casing and provided with an opening having straight edges for engagement with the flat sides of the neck of the corresponding shaft section whereby rotation of the plate with respect to the corresponding shaft section is prevented, and springs for forcing each of said plates yieldingly against the spherical casing.

In testimony whereof I affix my signature in presence of two witnesses.

ISADOR LEHMAN,

Witnesses:
  A. F. KWIS,
  C. H. TRESCH.